Figure 1:
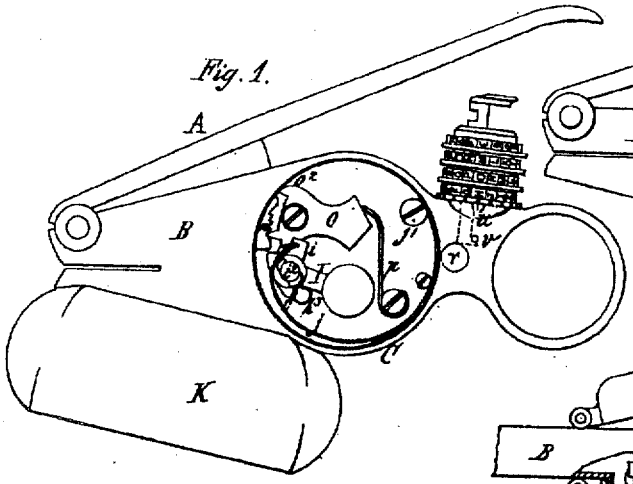

2 Sheets--Sheet 1.

J. CORBETT.

Registering Ticket-Punches.

No. 6929

Reissued Feb. 15, 1876

J. J. Bonner
Ernst Hadick } Witnesses.

Joseph Corbett Inventor
by Jay Hyatt
Atty.

A.M. PHOTO-LITHOGRAPHIC Co. N.Y. (OSBORNE'S PROCESS.)

2 Sheets--Sheet 2.

J. CORBETT.

Registering Ticket-Punches.

No 6929

Reissued Feb. 15, 1876

J. J. Bonner
Ernst Hoddick
Witnesses

Joseph Corbett Inventor
by Jay Hyatt
Atty.

AM. PHOTO-LITHOGRAPHIC CO. N. Y. (OSBORNE'S PROCESS)

UNITED STATES PATENT OFFICE.

JOSEPH CORBETT, OF HARTFORD, CONNECTICUT, ASSIGNOR TO THE RAILWAY-REGISTER MANUFACTURING COMPANY, OF BUFFALO, NEW YORK.

IMPROVEMENT IN REGISTERING TICKET-PUNCHES.

Specification forming part of Letters Patent No. 152,081, dated June 16, 1874; Reissue No. 6,145, dated November 24, 1874; Reissue No. 6,929, dated February 15, 1876; application filed February 7, 1876.

*To all whom it may concern:*

Be it known that I, JOSEPH CORBETT, of the city and county of Hartford, and State of Connecticut, have invented certain Improvements in Registering Ticket-Punches, of which the following is a specification, another division, B, filed October 20, 1874, covering features not specifically described here, and relating more particularly to the mechanical movements embraced.

The improvements relate to a conductor's ticket-punch, such as is shown and described in Letters Patent No. 111,392, granted to James H. Small, January 31, 1871, to which reference is here made for a full description of said instrument. As shown and described in this patent, the punch proper has combined with it a suitable receptacle for the punch-cuttings, and an alarm and a registering mechanism, both simultaneously operated each time the punch is used or the handle closed. The bell and registering device are arranged side by side, separated by a partition-plate within a case located between and attached to one of the handles of the punch. The two faces of this case are provided with hinged covers for affording access, respectively, to the bell and registering mechanism. These covers, in the patent above referred to, are shown fastened in a closed position by means of a single connecting-wire and soft-metal seal.

One part of the present invention relates more particularly to an improvement in the construction of the register-actuating mechanism, for the purpose of preventing the bell being rung without operating the register, which has sometimes been accomplished by partly closing the handles of the punch and raising the bell-hammer in such a degree that by suddenly allowing the handles to spring open the alarm will be rung, while this movement of the handles is insufficient to move the register; that is to say, that this feature of this invention is especially for the purpose of supporting and keeping the bell hammer (after it has once commenced to move away from the bell preparatory to striking an alarm) from returning and striking the bell till after the registering mechanism has so far acted as to insure a proper registration of the alarm.

Another part of the invention relates to certain improvements in the means for locking the covers of the bell and register case.

The invention consists, first, in the combination, with an alarm and register, of a series of ratchets, a shifting-cam, and a spring detent-pawl, which latter is held in contact with said ratchets until released at the completion of the closing movement of the handles, whereby the ringing of the alarm by partially closing the handles and then suddenly releasing the same is prevented. This prevention of a false alarm results from the application of a detent, which serves to keep the bell-hammer from touching the bell till the proper time arrives for the alarm to be given, when the continued force of the operator actuating the mechanism causes the release of the detent, following which the alarm will take place, but not till the desired registration is made certain; but previous to such release of the detent no alarm can be struck by the bell-hammer. Second, in the combination, with such alarm and register, of two series of ratchets, an intermediate shifting-cam, and a reversible spring detent-pawl, whereby the movement of closing as well as opening the handles must be completed before it can be reversed, and the ringing of the alarm by opening the handles partially, but not sufficiently to set the register for the next closing movement, is prevented. Third, in the combination, with the alarm and register, of a cam for actuating the bell-hammer. Fourth, in the combination, with the alarm mechanism, of a reversible pawl for returning the bell-cam to its normal position, as hereinafter described. Fifth, in the combination of a locking-bar with the two oppositely-arranged covers of the bell and register-case, each provided with a notched hasp, which, in closing the covers, overlap each other, so as to cause the notches therein to coincide and permit a single bar to lock both covers. Sixth, in the arrangement of a combination-lock for securing the covers of the bell and registering mechanism. Seventh, in the combination, with the box for the punch-cuttings and one of the covers of the bell and register case of a ticket-punch, of a locking bolt or pin, arranged so that when the said cover is in a closed position it will retain the locking-pin in place and prevent the detachment of the box. Eighth, in the combination, with the unit-registering wheel and actuating-pawl, of a secondary registering-wheel, having one of its teeth or ratchets cut away, so that said wheel will cease to be actuated by the pawl when the latter engages in the space so formed in its circumference, whereby any attempt to start the registering mechanism back of the proper starting-point is detected, as hereinafter fully described. Ninth, in the combination, with the locking-bar of a combination-lock, of a movable piece provided with the locking-notches, and so connected to the locking-bar that it will be moved outwardly, and thereby increase the hold or gripe of the bar on the locking-rings when an upward pressure is applied to the bar in attempting to pick the lock.

Figure 3:
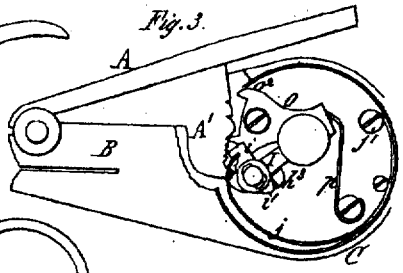
Figure 4:
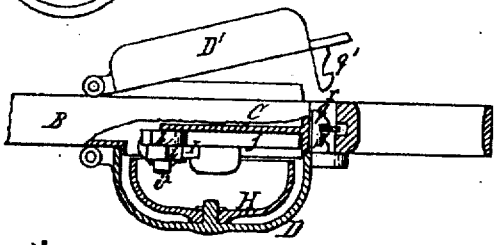
Figure 2:
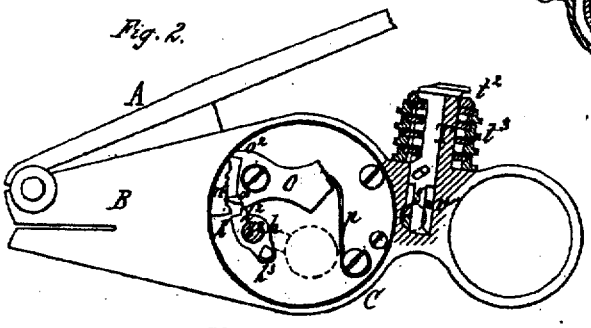
Figure 8:
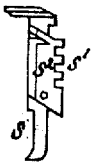
Figure 7:
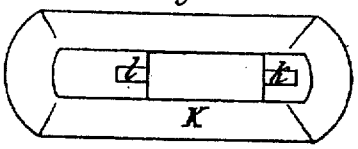
Figure 6:
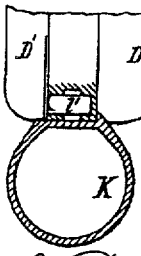
Figure 5:
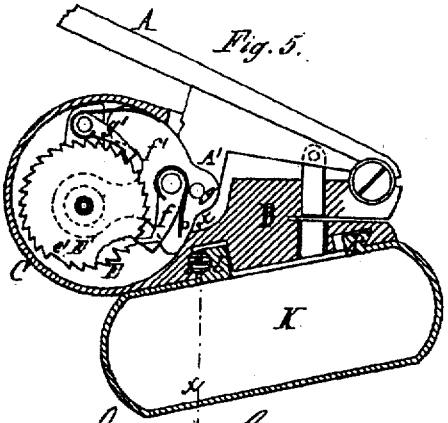
Figure 9:
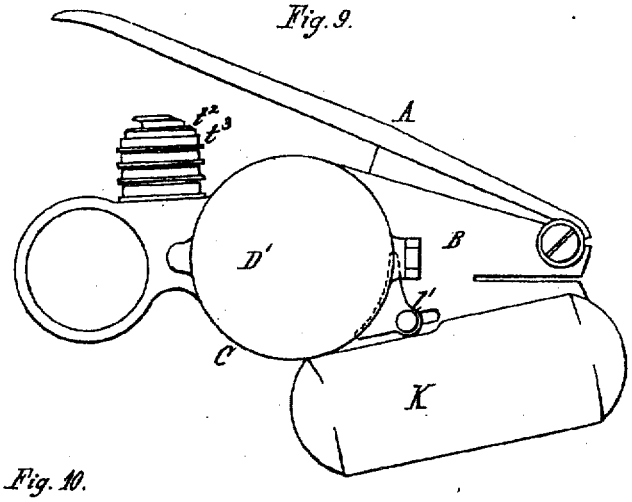
Figure 10:
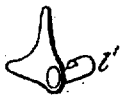
Figure 11:
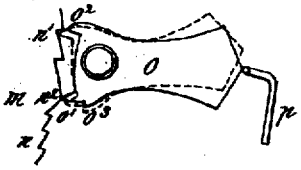
Figure 12:
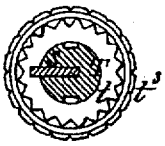
Figure 14:
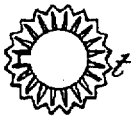
Figure 16:
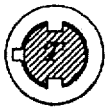
Figure 13:
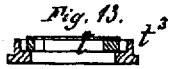
Figure 15:
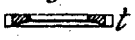

In the accompanying drawing, consisting of two sheets, Figure 1 is an elevation of my improved punch in an open position, with the bell-cover removed. Fig. 2 is a similar view, with the device for locking the covers in section. Fig. 3 is a fragmentary elevation with the handles closed, portions being broken away to expose the mechanism by which the bell-hammer is operated. Fig. 4 is a fragmentary horizontal section through the bell-case of the punch. Fig. 5 is a reverse sectional elevation of the punch. Fig. 6 is a vertical section on line *x x*, Fig. 5. Fig. 7 is a top-plan view of the receptacle for the punch-cuttings. Fig. 8 is a detached view of the bar locking the covers. Fig. 9 is a reverse elevation of my improved punch. Fig. 10 is a detached perspective view of the locking-pin of the receptacle for the punch-cuttings. Fig. 11 is a detached view, on an enlarged scale, of the reversible pawl and ratchets. Fig. 12 is a top-plan view, and Fig. 13 is a vertical section, of one of the locking-rings of the combination-lock. Fig. 14 is a bottom-plan view, and Fig. 15 is a vertical section, of one of the inner adjustable locking-rings. Fig. 16 is a plan view of one of the washers arranged between the locking-rings.

Like letters designate like parts in each of the figures.

A is the upper and B the lower handle of the instrument, hinged together, and provided with a punch-tool in a common manner. C is the case containing the bell and register mechanism, on opposite sides of the partition thereof. D D′ are the covers of the case. E E′ are the register-wheels, and *f* the stepped pawl for actuating the same. It is attached to the radial arm *f′*, swinging on the arbor of the register-wheels, and connected with a projecting portion, A′, of the web of the upper handle A by a pin, *g*, projecting therefrom. The pawl *f* moves the register one degree each time the handles of the punch are closed, in an obvious manner. *g′* are two spring detent-pawls, arranged on a common fulcrum, and engaging with the register-wheels E E′, so as to prevent retrograde movement thereof. The general construction and operation of the register mechanism are substantially the same as that shown in the Letters Patent above referred to. H is the bell, secured to a stud on the inner side of the cover D; and I, the arm of the bell-hammer, pivoted to the partition of the case C. The arm I is provided with two secondary arms, $i$ $i^1$, arranged at right angles to the former, above and below its fulcrum $i^2$. *j* is a curved flat spring, secured to the case C at *j′* and bearing with its free end against the upper arm *i* of the bell-hammer, so as to hold the latter closed. *h* is a cam mounted loosely on the pivot $i^2$ of the bell-hammer, between the arm I of the latter and the partition of the case C. It is provided with a tooth, $h^1$, projecting under the portion A′ of the upper handle A, and a smaller projection or tooth, $h^2$, arranged in rear of the tooth $h^1$, while it carries on the opposite side of the pivot $i^2$ a shoulder, $h^3$, engaging under the arm I of the bell-hammer, in the angle formed by the arm $i^1$ with the arm I.

In closing the handles of the punch, the portion A′ of the upper handle strikes upon the tooth $h^1$ of the cam *h*, turning the latter on its pivot $i^2$, and raising the hammer against the spring *j* by means of the shoulder $h^3$ engaging under the arm I. The act of the operator producing the first movement of the bell-hammer in raising it away from the striking-point on the bell is followed by the action of the detent $o^1$, which catches into a notch in the lower part of the portion A′, which effectually prevents the return of the bell-hammer (now partly raised) to the bell, so that it is effectually secured and prevented from reacting upon the bell from its raised position, though it be but a short distance from the bell, thereby effectually guarding against the false alarm from a partial stroke of the bell-hammer; but when the operator has continued the application of the force necessary to perform the registration, and has secured the completion of the same, such continued force then causes the said detent to be released by means of a tripping piece or cam, $h^2$, after the action of which upon the detent, and not before, the bell-hammer may fall and produce the proper alarm.

The detent, during the continued motion of the parts from the force of the operator, is furthermore made to catch into more notches as the hammer is more and more raised, thus still more effectually guarding against any accidental release of the detent from any one notch, and consequent possible false alarm. The additional notches morever furnish means to catch and engage the detent, which will more certainly guard and prevent the occurrence of an improper blow from the hammer before any considerable momentum has been acquired, thus diminishing the strain which the detent would have to sustain in the event of an escape or slip, if there were but one other notch for the detent to re-catch and act upon.

The release of the detent $o^1$ at the proper time is effected by the tripping piece or cam $n^2$, more fully explained elsewhere herein. When the movement of the handles is completed and the bell-hammer released, the latter and the cam $h$ are returned to their former position by the spring $j$, and the bell is rung. In opening the handles the end of the portion A′ comes in contact with the tooth $h^1$ of the cam $h$, and turns the latter slightly on its pivot until said tooth clears the portion A′, the shoulder $h^3$ having a little play in the angle of the arms I and $i^1$, to permit the cam $h$ to be so turned back. By this means the spring-pawl is dispensed with, which was heretofore employed for operating the bell-hammer, and which frequently became deranged by the breaking of its spring.

$m$ is a ratchet-bar, formed with the portion A′ of the web of the upper handle A. It is provided with two series of ratchets, $n$ $n^1$, inclined in opposite directions, and an intermediate projecting tooth or cam, $n^2$. $o$ is the reversible detent-pawl, pivoted to the partition of the case C, and provided at one end with two teeth or detents, $o^1$ $o^2$, designated to engage, respectively, with the ratchets $n$ $n^1$, a special function of the detent $o^1$ having been hereinbefore set forth. The opposite end of the pawl $o$ is provided with two inclined sides or planes, as clearly shown in Fig. 11, against which the spring $p$ alternately presses, according to the respective position of the pawl. $o^3$ is a smaller tooth, arranged on the pawl $o$ in the rear of the lower tooth or detent $o^1$, and designed to engage with the tooth $h^2$ of the cam $h$, as will be presently described.

The punch being in the position shown in Fig. 1, with the handles distended, the spring $p$, bearing against the upper incline of the detent-pawl $o$, holds the lower tooth $o^1$ of the latter against the lower and upwardly-inclined ratchet $n$.

In closing the handles, in operating the punch, the detent-pawl $o^1$ slides over the said ratchets until it comes in contact with the cam-tooth $n^2$, which turns the pawl $o$ on its pivot until the spring $p$, which has pressed against the upper inclined side of the pawl, passes the apex thereof, and engages against the lower incline, when the pawl $o$ is shifted so as to engage its upper tooth $o^2$ with the upper series of ratchets $n^1$, as clearly shown in dotted lines, Fig. 11.

During the closing movement of the handles, the detent $o^1$, being in contact with the lower series of ratchets $n$, prevents any retrograde movement of the handles until after the closing movement is nearly completed and the register moved one degree, when the pawl $o$ is shifted, as above described, so as to clear the lower ratchets $n$ and permit the handles opening. Hence, an attempt to ring the bell without operating the register, by partially closing the handles, and then suddenly releasing the same, will be unsuccessful.

During the last portion of the closing movement of the handles the portion A′ is disengaged from the bell-hammer and the bell rung, the register having been moved one degree and locked by the respective detent-pawl a little before the bell is rung.

In opening the handles the pawl $o$ slides over the upper series of ratchets $n^1$, and prevents, in a similar manner, the closing of the same until the handles are almost completely opened. This prevents the ringing of the bell by opening the handles to such a degree as to engage the hammer-pawl with the bell-hammer, but not sufficiently to cause the register-actuating pawl to engage over the next notch of the register-wheel. During the last portion of the opening movement the cam-tooth $n^2$ comes in contact with the upper tooth $o^2$ of the pawl $o$, and shifts the pawl to its normal position, leaving the punch free for a second operation. During this shifting of the pawl $o$ the tooth $o^3$ thereof comes in contact with the tooth $h^2$ of the cam $h$, as shown in Fig. 2, so that the said cam, which has been slightly turned back during the opening of the handles, as hereinbefore described, will be returned to its former position, with the tooth $h^1$ projecting under the portion A′ of the upper handle, ready for a second closing of the handles.

$q$ $q'$ are the notched hasps, projecting inwardly from the covers D D′, respectively. $r$ is a hole formed through the handle E for the reception of the hasps $q$ $q'$ when the covers are closed. The hasps, in the closed position, overlap each other, so as to cause their notches to coincide. $s$ is a sliding bar or bolt, arranged in a vertical recess or mortise intersecting the hole $r$, so that the lower end of the bar $s$ projects into the latter and engages in the notches of the hasps $q$ $q'$, firmly locking the same. T is a cylinder or arbor projecting upward from the handle B, and having formed radially in it the upper portion of the mortise, in which the bar $s$ slides. The outer edge of the latter is provided with notches or teeth $s^1$, with which engage a corresponding number of notched locking-disks, $t$, turning freely on the arbor T, and held in place by a screw-cap, $t^2$. Upon making the notches of all the disks $t$ coincide the bar $s$ can be sufficiently raised to release the hasps $q$ $q'$, as shown in dotted lines in Fig. 1, while, by turning the disks $t$ so as to break this coincidence of their notches, the bar $s$ is locked in its lowest position, as shown in Fig. 2. The outer disks $t^3$, inclosing the locking-disks, are provided with characters or figures, corresponding in number with the notches in the inner changeable disks $t$, and the proper position of the locking-disks $t^3$, for releasing the bar $s$, is determined by arranging the same so that the required series of characters or figures coincides with a fixed mark or notch, $u$, of the handle B, in the manner common with this class of combination-locks. The combination of the characters or figures which permits the opening of the locks is, of course, known only to the person authorized to open the punches. The lower portion of the bar $s$ is reduced in width, and its lower end provided with a projection or hook, as shown in Fig. 2, which, when the bar is sufficiently raised to disengage the hasps $q$ $q'$, engages under a pin, $v$, thereby preventing the entire withdrawal of said bar. The locking-bar $s$ is preferably provided with a movable piece, $s^2$, in which the notches $s^1$ are formed, and which is connected with the bar $s$ at one end by a pin engaging in a downwardly-inclined slot of said bar, as shown in Fig. 2, and at the opposite end by an exterior rib running in a groove arranged in the bar $s$ parallel to said inclined slot, as shown in Fig. 8. When an upward pressure is applied to the locking-bar $s$, for the purpose of picking the lock, the teeth of the movable piece $s^2$, in engaging under the locking-disks, will cause the piece $s^2$ to slide outwardly, and thereby increase the hold of the bar $s$ on the locking-disks. K is the receptacle for the punch-cuttings, secured to the under side of the jaw B of the punch. It is of cylindrical or other suitable shape, and provided with a single aperture in its side, adjacent to the jaw B. As shown in the drawing, the receptacle K is fastened to the jaw B by a hook, $k$, engaging in a suitable mortise formed in said jaw, and a tenon or hasp, $l$, projecting into a recess in the jaw B, and secured therein by a locking-pin, $l'$, passing through the jaw B and tenon $l$. If preferred, a tenon, $l$, only may be used for connecting the receptacle K to the jaw B, and the hook $k$ be dispensed with. The locking-pin $l'$ is arranged so that its head or a flange formed therewith is overlapped by the cover D′ when in a closed position, so as to prevent its withdrawal, and consequent detachment of the receptacle K and access thereto, until the cover D′ is unlocked and opened. In the second registering-wheel E′, which is moved one notch for every revolution of the unit-wheel E, one of the ratchets or teeth is cut out, as shown at $e'$, Fig. 5, and the wheel E′ so arranged that its movement will commence at the tooth next following this open space. After the wheel E′ has almost completed a revolution, so that the actuating-pawl $f$ engages in the space $e'$, the wheel E′ remains stationary, irrespective of all further movement of the unit-wheel E. In order to bring the wheel E′ again in engagement with the actuating-pawl $f$, it must be moved by hand one notch over this locking position.

When the person using the punch obtains access to the registering mechanism by picking the lock thereof, and sets the hands back of the starting-point, for the purpose of retaining the number of fares which he cancels during the movement of the registering mechanism from the point on which it has been so placed to the starting-point, the fraud is exposed by the wheel E′ remaining stationary at the last notch before reaching the starting-point, thus indicating that the full number of fares have been canceled which the apparatus is capable of registering, while a less number of fares are returned.

I claim—

1. The combination, with an alarm and a register, simultaneously operated for recording the number of times the alarm has been rung, of the series of ratchets $n$, shifting-cam $n^2$, and spring detent-pawl $o$, substantially as and for the purpose hereinbefore set forth.

2. The combination, with such alarm and register, of the ratchets $n$ $n^1$, intermediate shifting-cam $n^2$, reversible spring detent-pawl $o$, substantially as and for the purpose hereinbefore set forth.

3. The combination, with the alarm and register, of the cam $h$, provided with the tooth $h^1$, and shoulder $h^3$, for raising the alarm-hammer, substantially as hereinbefore set forth.

4. The combination, with the alarm and register, of the bell-hammer I, cam $h$, provided with tooth $h^2$, and reversible pawl $o$, having a tooth, $o^3$, for returning the cam $h$ to its normal position, substantially as hereinbefore set forth.

5. The combination, with the covers D D′, provided with notched hasps $q$ $q'$, of the locking-bar $s$, for securing the covers, substantially as and for the purposes hereinbefore set forth.

6. The combination, with the covers D D′, notched hasps $q$ $q'$, and locking-bar $s$, of the combination-lock herein shown and described.

7. The combination, with the receptacle K and cover of the bell or registering mechanism, of the locking-pin $l'$, retained in place by said covers, substantially as and for the purpose hereinbefore set forth.

8. The combination, with the unit-registering wheel E and actuating-pawl $f$, of the secondary registering-wheel E′, provided with the space $e'$, formed by cutting away one of its notches or teeth, substantially as and for the purpose hereinbefore set forth.

9. The combination, with the locking-bar $s$, of the movable piece $s^2$, provided with notches $s^1$, and connected to said bar, and adapted to slide outwardly, to more firmly lock the bar $s$ when an upward pressure is applied to the latter, substantially as hereinbefore set forth.

10. The combination, with alarm and registering mechanism, simultaneously operated for registering the number of times the alarm has been sounded, of one or more ratchet-teeth or bearing-pieces, adapted in shape to receive a detent, and such detent serving to prevent sounding of the alarm until the detent has been tripped or withdrawn by a tripping piece or cam, operating coincidently with the actuating registering mechanism, for the purpose set forth.

11. In an alarm-register, the combination of the actuating mechanism with a tripping piece or cam, serving to withdraw or disengage a detent adapted to control the operation of the alarm mechanism, for the purpose set forth.

JOSEPH CORBETT.

Witnesses:
WM. E. SIMONDS,
R. F. GAYLORD.